（12）United States Patent
Jung

(10) Patent No.: US 9,552,643 B2
(45) Date of Patent: Jan. 24, 2017

(54) METHOD AND APPARATUS FOR ESTIMATING POSITION OF PART OF OBJECT

(71) Applicant: SAMSUNG ELECTRONICS CO., LTD., Suwon-si (KR)

(72) Inventor: Ho-yub Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 14/740,702

(22) Filed: Jun. 16, 2015

(65) Prior Publication Data

US 2015/0363933 A1 Dec. 17, 2015

(51) Int. Cl.
*G06T 7/00* (2006.01)
*G06K 9/00* (2006.01)

(52) U.S. Cl.
CPC ......... *G06T 7/0044* (2013.01); *G06K 9/00201* (2013.01); *G06K 9/00362* (2013.01); *G06T 2207/20144* (2013.01); *G06T 2207/30196* (2013.01)

(58) Field of Classification Search
CPC ............ G06K 9/00201; G06K 9/00362; G06K 9/00369; G06K 9/00375; G06K 9/6267; G06T 7/004; G06T 7/0042; G06T 7/0044; G06T 7/0048; G06T 2207/20076; G06T 2207/30196
See application file for complete search history.

(56) References Cited

U.S. PATENT DOCUMENTS

| 8,452,051 | B1 | 5/2013 | Lee | 382/103 |
| 2010/0325590 | A1* | 12/2010 | Homma et al. | 715/863 |
| 2011/0210915 | A1 | 9/2011 | Shotton et al. | 345/157 |
| 2012/0070070 | A1 | 3/2012 | Litvak | 382/154 |
| 2015/0213617 | A1* | 7/2015 | Kim et al. | G06T 7/2093 382/103 |

OTHER PUBLICATIONS

Girshick, et al.; "Efficient Regression of General-Activity Human Poses from Depth Images", International Conference on Computer Vision, Institute of Electrical and Electronics Engineers, Oct. 2011, 8 pages total.
Sun, et al.; "Conditional Regression Forests for Human Pose Estimation", Proceedings of Computer Vision and Pattern Recognition Conference, Institute of Electrical and Electronics Engineers, Jan. 2012, 8 pages total.

* cited by examiner

*Primary Examiner* — Andrew W Johns
(74) *Attorney, Agent, or Firm* — Sughrue Mion, PLLC

(57) ABSTRACT

An apparatus configured to estimate a position of a part of an object in an image includes: an image receiver configured to receive the image; a reference point setter configured to set a reference point in the image; a controller configured to generate information about the reference point by repeating a process a predetermined number of times, the process comprising obtaining one piece of direction information about a probability and a direction that the reference point is to be moved to the part of the object by a classifier, and resetting the reference point by moving the reference point a predetermined distance based on the one piece of direction information; and a location estimator configured to estimate a position of the part of the object in the image by using the information about the reference point as the reference point is reset the predetermined number of times.

26 Claims, 10 Drawing Sheets

FIG. 8

| 1,1 | 1,2 | 1,3 | 1,4 | 1,5 | 1,6 | 1,7 | 1,8 | 1,9 | 1,10 |
|---|---|---|---|---|---|---|---|---|---|
| 2,1 | 2,2 | 2,3 | 2,4 | 2,5 | 2,6 | 2,7 | 2,8 | 2,9 | 2,10 |
| 3,1 | 3,2 | 3,3 | 3,4 | 3,5 | 3,6 | 3,7 | 3,8 | 3,9 | 3,10 |
| 4,1 | 4,2 | 4,3 | 4,4 | 4,5 | 4,6 | 4,7 | 4,8 | 4,9 | 4,10 |
| 5,1 | 5,2 | 5,3 | 5,4 | 5,5 | 5,6 | 5,7 | 5,8 | 5,9 | 5,10 |
| 6,1 | 6,2 | 6,3 | 6,4 | 6,5 | 6,6 | 6,7 | 6,8 | 6,9 | 6,10 |
| 7,1 | 7,2 | 7,3 | 7,4 | 7,5 | 7,6 | 7,7 | 7,8 | 7,9 | 7,10 |
| 8,1 | 8,2 | 8,3 | 8,4 | 8,5 | 8,6 | 8,7 | 8,8 | 8,9 | 8,10 |
| 9,1 | 9,2 | 9,3 | 9,4 | 9,5 | 9,6 | 9,7 | 9,8 | 9,9 | 9,10 |
| 10,1 | 10,2 | 10,3 | 10,4 | 10,5 | 10,6 | 10,7 | 10,8 | 10,9 | 10,10 |

METHOD AND APPARATUS FOR ESTIMATING POSITION OF PART OF OBJECT

CROSS-REFERENCE TO RELATED APPLICATION

This application claims priority from Korean Patent Application No. 10-2014-0072975, filed on Jun. 16, 2014, in the Korean Intellectual Property Office, the disclosure of which is incorporated herein in its entirety by reference.

BACKGROUND

1. Field

Exemplary embodiments relate to a method and an apparatus for estimating a position of a part of an object in an image.

2. Related Art

Currently, there is a need for technology for estimating a pose of a body by using a depth camera that generates information about a target object in a three-dimensional (3D) space to obtain a life-like user interface (UI). A pose of a body may be estimated in real time by using computer vision technology and a depth camera. The pose of a body may consist of positions of body parts such as a head, a neck, a hand, an elbow, or a foot, and the estimation of the pose of a body may be used to control a UI or a game.

Technologies for estimating the position of a part of a body are used to estimate positions of each parts of a human body in an image captured by a depth camera.

However, a lot of calculation time is needed to classify a part of a body, and it may be difficult to adjust a time for classifying a particular part of a body.

SUMMARY

Additional aspects will be set forth in part in the description which follows and, in part, will be apparent from the description, or may be learned by practice of the presented exemplary embodiments.

According to one or more exemplary embodiments, an apparatus configured to estimate a position of a part of an object in an image includes: an image receiver configured to receive the image; a reference point setter configured to set a reference point in the image; a controller configured to generate information about the reference point by repeating a process a predetermined number of times, the process comprising obtaining at least one piece of direction information about a probability and a direction that the reference point is to be moved to the part of the object by a classifier, and resetting the reference point by moving the reference point a predetermined distance based on the at least one piece of direction information; and a location estimator configured to estimate a position of the part of the object in the image by using the information about the reference point as the reference point is reset the predetermined number of times.

The classifier may be machine-learned for the part of the object, and generate the at least one piece of direction information about the probability and the direction in which the reference point is to be moved to the part of the object.

The information about the moving of the reference point may include a route via which the reference point is moved.

The controller may remove a background from the image.

The image may include at least one selected from among a depth image and a two-dimensional (2D) image.

The object may include at least one selected from among a physical body and a thing.

The reference point may be a point that is randomly selected in the image from which the background is removed.

The reference point may be set by using the position of the part of the object in one of images of frames previous to a current frame of the image from which the background is removed.

The reference point may be a center point of the image from which the background is removed.

The controller may randomly select one of the at least one piece of direction information.

The controller may select one from among the at least one piece of direction information based on a probability corresponding to the at least one piece of direction information.

The predetermined distance may be determined based on characteristics of the part of the object.

The predetermined number of times may be set based on a certain period of time allocated to estimate the position of the part of the object.

The predetermined number of times may be determined based on a dispersion value of locations of the reference point which are changed according to the moving of the reference point.

The predetermined number of times may be determined based on a probability corresponding to the at least one piece of direction information obtained by using the classifier.

The controller may estimate a pose of the object based on the position of the part of the object.

According to one or more exemplary embodiments, a method of estimating a position of a part of an object in an image includes: receiving the image; setting a reference point in the image; generating information about the reference point by repeating a process a predetermined number of times, the process comprising obtaining at least one piece of direction information about a probability and a direction that the reference point is to be moved to the part of the object by a classifier, and resetting the reference point by moving the reference point a predetermined distance based on the at least one piece of direction information and estimating a position of the part of the object in the image by using the information about the reference point as the reference point is reset the predetermined number of times.

According to one or more exemplary embodiments, a non-transitory computer-readable recording storage medium having stored thereon a computer program which, when executed by a computer, may perform the method.

BRIEF DESCRIPTION OF THE DRAWINGS

These and/or other aspects will become apparent and more readily appreciated from the following description of the exemplary embodiments, taken in conjunction with the accompanying drawings in which:

FIG. 8 shows a table for explaining a process of moving a reference point by using direction information, which is obtained by using a classifier, according to an exemplary embodiment;

DETAILED DESCRIPTION

Figure 1:
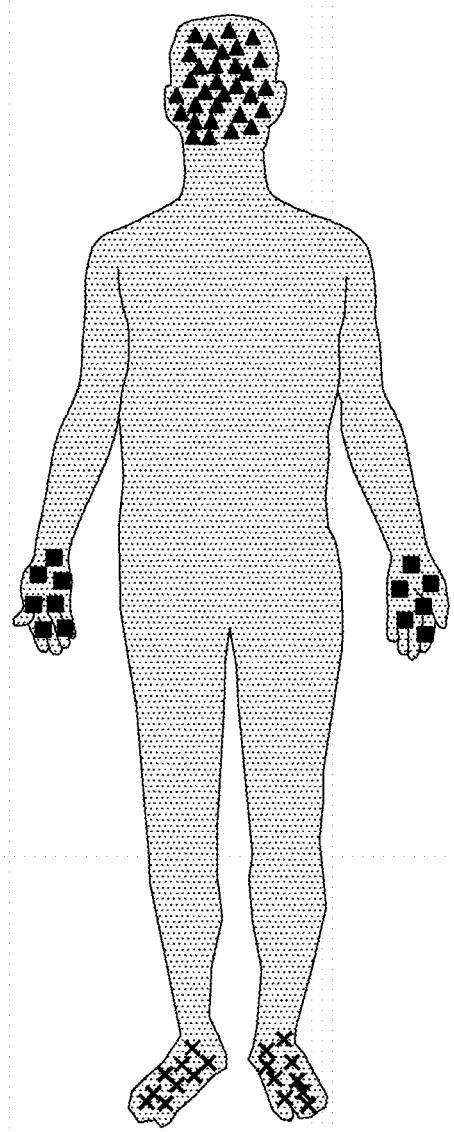
FIG. 1 illustrates a conceptual diagram showing a method of estimating a position of a part of an object according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the inventive concept allows for various changes and numerous exemplary embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

An object described herein may include a physical body or a thing. Additionally, even if a physical body is used instead of an object in the description of the specification, this is only an exemplary embodiment, and a thing other than a physical body of a person may also be included in the object. A part of an object may include, for example, a physical body part such as a head, an arm, a leg, a hand, or the like. A thing may include, for example, a head, a beak, or a wing of a bird.

A part of an object described herein may refer to a particular part of a physical body or a thing which a user wants to find.

Classification of parts of an object, described herein, may refer to estimation of a position of parts of an object in an image.

According to one or more exemplary embodiments, a classifier described herein may refer to an apparatus, or a classification module implemented by a processor. Additionally, a classifier described herein may be located inside or outside an apparatus according to one or more exemplary embodiments.

Hereinafter, exemplary embodiments will be described in detail with reference to the attached drawings. Like reference numerals in the drawings denote like elements, and thus their descriptions will not be repeated.

A process of estimating a pose of a physical body in a depth image is as follows:

A physical body in an image is separated from a background of the image, and positions of joints may be found in the physical body separated from the background, by using machine-learning technology. In other words, positions of joints may be found by executing a machine-learning classifier on each pixel of the physical body separated from the background. The machine-learning classifier needed in this process may be obtained by performing mechanically-repeated learning. This is referred to as a training process.

The machine-learning classifier described herein may classify respective pixels into a particular body part such as a head, an arm, a trunk, or the like, and estimate a relative position (vector) of the body part. For example, the machine-learning classifier may receive an input of an image and a pixel point (x, y, z) in the image, and then, output a relative position of a head with respect to the pixel point (x, y, z). Positions (pixels) or relative positions of physical parts determined by using the machine-learning classifier are integrated, and thus, the body parts in the image may be classified.

A pixel-wise labeling method, from among such body part classification technologies, is a method of receiving an input of a pixel and labeling a body part corresponding to the pixel by using a classifier trained through machine-learning. In other words, if a particular pixel is input to a classifier, a name of a body part corresponding to the particular pixel is derived. However, problems of such a method are as follows:

(1) In the pixel-wise labeling method, much calculation time is needed for pixel-wise classification. In other words, a large amount of parallel calculation is needed to classify body parts. Alternatively, if a depth image is resized to reduce calculation time, there may a risk that thin body parts or small body parts with a small imprint on the image may be deleted or discarded. Additionally, if pixels are uniformly classified, that is, if pixels are selected with a certain interval and classified, a large part such as a trunk, torso, or leg may be easily found, but it may be difficult to accurately determine a small part such as a hand.

(2) In the pixel-wise labeling method, different amounts of calculation resources are respectively allocated to different body parts and poses. For example, since a trunk is bigger than a hand and more pixels are present in the trunk than in the hand, more calculation time is needed for the trunk than for the hand. However, there is a problem in that this does not mean the trunk is more important than the hand.

Additionally, since body parts adjacent to a camera have a larger pixel area than other body parts, front body parts in an image need more calculation time than rear body parts in the image. Additionally, the pixel-wise labeling method may not classify body parts that are not shown in an image.

(3) In the pixel-wise labeling method, since a classifier is trained to estimate positions of all parts, if the complexity of the output from the classifier increases, the accuracy may be reduced.

However, according to one or more exemplary embodiments, the total calculation time for estimating a position of a part of a body based on machine learning may be reduced. For example, according to one or more exemplary embodiments, if a probability, calculated at a position to which a reference point in an image is moved, has a predetermined value or if a predetermined number of times for which moving of the reference point in the image is repeated is achieved, the moving of the reference point in the image may be stopped, and thus, calculation time may be reduced. Additionally, the calculation time for estimating a position of a part of a body in a current image may be reduced by using information about the part of the body in a previous image. This is described in detail with reference to FIG. 1.

Further, according to one or more exemplary embodiments, an amount of calculation time allocated for each part of a body may be adjusted. For example, a predetermined number of times for which a reference point for each part of a body in an image is moved may be determined. Further still, more calculation time may be allocated for important parts of a body such as a hand. In addition, same calculation resources may be allocated for hidden parts of a body as for parts of the body shown in an image.

Moreover, according to one or more exemplary embodiments, a separate classifier may be used for each part of a body. Thus, complexity of classifiers may be reduced, and each part of the body may be rapidly and accurately estimated.

FIG. 1 illustrates a conceptual diagram showing a method of estimating a position of a part of an object according to one or more exemplary embodiments.

In FIG. 1, a plurality of dots shown as triangles, squares, or Xs are obtained when an apparatus estimates positions of a head (marked with triangles), hands (marked with squares), or feet (marked with Xs) of an object in an image, according to one or more exemplary embodiments.

According to one or more exemplary embodiments, if the apparatus moves a reference point in the image, after the reference point is moved a predetermined number of times, the reference point may be moved in a part of the object. As shown in FIG. 1, if points to which the reference point is moved are shown as dots, a position of the part of the object may be determined by using the dots.

Additionally, a pose may be additionally estimated by using estimated positions of the part of the object.

Estimated positions of parts of the object are marked with symbols such as triangles, squares, or Xs, but are not limited thereto. For example, estimated positions of parts of an object may be distinguished by using dots of different colors from each other.

Only the estimating of the positions of the head, the hands, and the feet are shown in FIG. 1. However, positions of parts such as shoulders, knees, or a trunk may also be estimated by using the apparatus according to one or more exemplary embodiments.

Additionally, according to one or more exemplary embodiments, it is shown in FIG. 1 that the apparatus has estimated positions of parts of a physical body of a person only. However, exemplary embodiments are not limited thereto, and the apparatus may also estimate positions of parts of animals or other targets.

Figure 2:
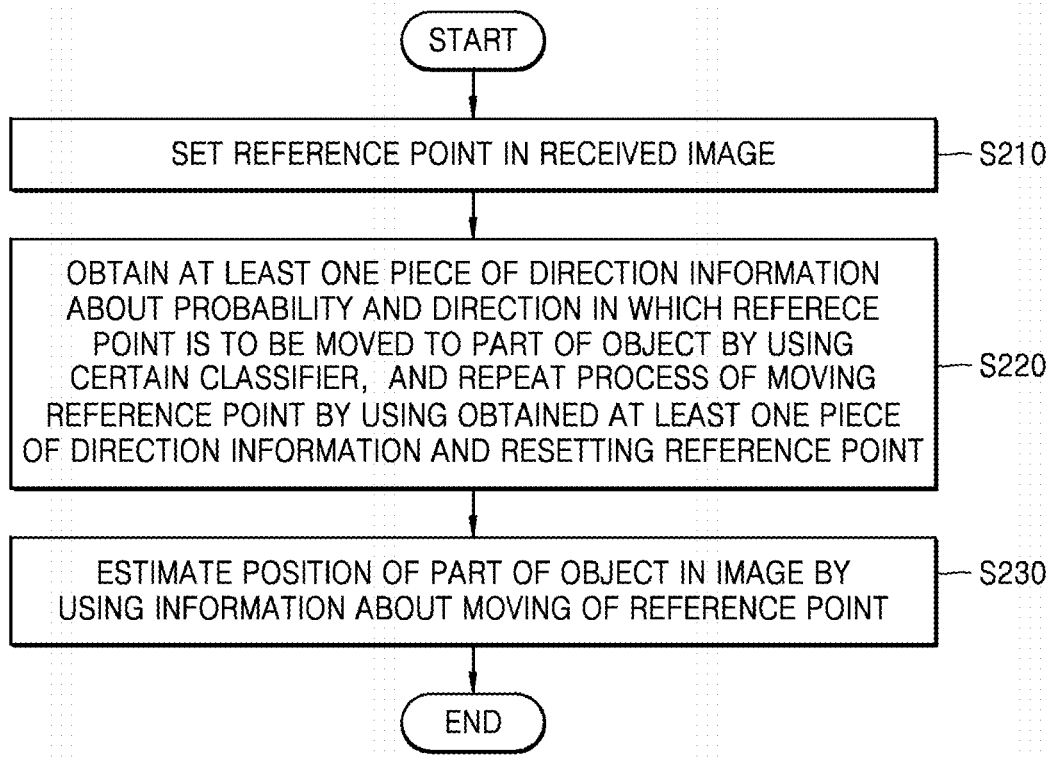
FIG. 2 illustrates a flowchart of a method of estimating a position of a part of an object in an image according to an exemplary embodiment.

FIG. 2 illustrates a flowchart of a method of estimating a position of a part of an object in a depth image according to one or more exemplary embodiments.

In operation 5210, a reference point is set at a starting point, from which the reference point is to be moved, in a received image. The image may be a depth image or a two-dimensional (2D) image.

According to one or more exemplary embodiments, a background may be removed from the image before the reference point is set. In other words, the background may be removed, and only an object may remain in the image.

According to one or more exemplary embodiments, the reference point may be set at random. Additionally, the reference point may be set based on a position of a part of a body in an image of a previous frame (e.g., a frame immediately preceding the current frame or any frame is before the current frame). For example, if a position of a head in the image of the previous frame is known, a position of the head may not be greatly changed in an image of a current frame. A reference point that is set based on the position of the part of the object in the image of the previous frame may help to quickly search for the part of the object in the image of the current frame.

Additionally, the reference point may be set based on a position of another body part that was already determined in the image of the current frame. For example, when positions of arms are estimated, if a position of a head was already estimated, the apparatus may determine the position of the head, which is near the arms, as a reference point and start to move the reference point. Alternatively, if positions of a trunk, legs, and a head are already known, one of points, other than the positions of the trunk, the legs, and the head, may be employed as a reference point.

In operation S220, at least one piece of direction information about a probability and a direction in which the reference point is to be moved to a part of the object is obtained by using a classifier, and a process of moving the reference point for a certain distance and resetting the reference point by using the obtained at least one piece of direction information may be repeated a predetermined number of times.

In detail, at least one piece of direction information about a probability and a direction in which the reference point is to be moved to a part of an object may be obtained by using a classifier to which an image with a reference point is input. The classifier may be a classifier that is machine-learned with respect to the part of the object. The classifier is described with reference to FIG. 3. The at least one piece of direction information may include a plurality of directions in which the reference point may be moved and a probability that the reference point is to be moved to the part of the object if the reference point is moved in one of the plurality of directions. For example, the plurality of directions may be a plurality of direction unit vectors. A plurality of directions and a probability are described in detail with reference to FIG. 8.

According to one or more exemplary embodiments, if an image is already input to the classifier, only a reference point may be input to the classifier.

According to one or more exemplary embodiments, the apparatus may obtain at least one piece of direction information, and then, select one from among the obtained at least one piece of information. For example, one piece of direction information may be selected at random. Additionally, one piece of direction information may be selected based on a probability corresponding to direction information. For example, one piece of direction information having a highest probability that the reference point is to be moved to the part of the object may be selected.

After the one piece of direction information is selected, the reference point is moved a predetermined distance by using the selected piece of direction information. The distance may be determined based on characteristics of the part of the object. The characteristics of the object may include the shape of the object, average size of the part of the object, distance of the part of the object from other parts of the object, and/or proportion of the size of the part of the object to the size of the object or other parts of the object. For example, the distance for which the reference point is to be moved may be defined by a user with respect to each part of the object such as arms, legs, or a head.

Additionally, the distance may be appropriately adjusted according to a size of a part of the object. For example, if a position of a large part such as a trunk is to be estimated, a distance the reference point is to be moved may be adjusted to be long compared to other parts. If a position of a small part such as a hand is to be estimated, a distance the reference point is to be moved may be adjusted to be short compared to other parts.

Additionally, the distance for which the reference point is to be moved may be set at random. Additionally, according to one or more exemplary embodiments, with respect to each part of an object, an optimum distance for which the reference point is to be moved may be searched for and set by performing machine-learning. Here, the distance may be determined while moving of the reference point is repeated.

According to one or more exemplary embodiments, a predetermined number of times that moving of a reference point is repeated may be a maximum number of times which are set with respect to each part of the object so that the reference point may be moved. For example, a maximum number of times the reference point is to be moved to estimate a position of a head may be limited to 30 times.

Additionally, a predetermined number of times the reference point is to be moved may be set based on an accuracy of a probability of at least one piece of information obtained by a classifier. For example, direction information obtained by the classifier may include a direction in which the reference point is to be moved and a probability corresponding to the direction. If the probability corresponding to the direction is greater than a threshold value, for example, if the threshold value is 98% and a probability that a reference point is to be moved to a part of the object is 99%, it may be estimated that the reference point is currently located at a head. Additionally, if there are a plurality of pieces of obtained direction information and probabilities corresponding to more than a half of the plurality of pieces of obtained direction information are greater than the threshold value, it may be estimated that the reference point is currently at the part of the object.

In other words, if a probability of a direction vector is higher than a predetermined threshold value or a threshold probability, it may be determined that a certain accuracy is achieved, and thus, repeating of moving of the reference point may be stopped and a next operation may be performed.

According to one or more exemplary embodiments, a certain number of times may be a number of cases when distribution of points to which the reference point is moved is formed in a certain area. For example, if the reference point is to be moved for a $100^{th}$ time, points at which the reference point has been moved when the reference point was moved for $90^{th}$ through $99^{th}$ times are placed in an area having a predetermined size, it may be determined that the reference point has been moved the predetermined number of times.

In operation S230, a position of the part of the object in the image may be estimated by using information related to moving of the reference point. The information regarding the moving of the reference point may refer to information that includes traces in which the reference was moved in the past. For example, the information regarding the moving of the reference point may include all points to which the reference has moved.

In detail, a position of the part of the body may be estimated based on the points to which the reference point has moved. In other words, if one of a plurality of direction vectors is randomly selected and the reference point is moved a predetermined distance, the reference point may be consistently moved in a direction having a high probability of being toward the object, and the reference point may be repeatedly moved in a position of the part of the object. Then, the position of the part of the object may be estimated by averaging points to which the reference point is moved. For example, if the reference point is moved 50 times and points to which the reference point is moved for $40^{th}$ through $50^{th}$ times are distributed in positions proximate to each other, points to which the reference point was moved the last 10 times may be estimated as being in a position of the part of the object. In a process of the estimating, an algorithm such as a neural network algorithm, a support vector machine (SVM) algorithm, a random walk algorithm, or a classification and regression trees (CART) algorithm may be employed.

A process of estimating a position of a part of a body is described in detail with reference to FIGS. 5 and 6. An estimated position or a relative position of a part of an object are comprehensively taken into account, and thus, even a pose of the object may be estimated.

According to one or more exemplary embodiments, a classifier may be respectively machine-learned for a part of the object, and thus, generated. In other words, a classifier for a particular machine-learned part of an object may be generated. For example, a classifier machine-learned for a head may be employed to estimate a position of a head.

According to other exemplary embodiments, a classifier may be machine-learned with respect to a whole part of an object, and generated. The classifier machine-learned with respect to a whole part of the object may be employed for estimating a position of an arbitrary part of the object.

Figure 3:
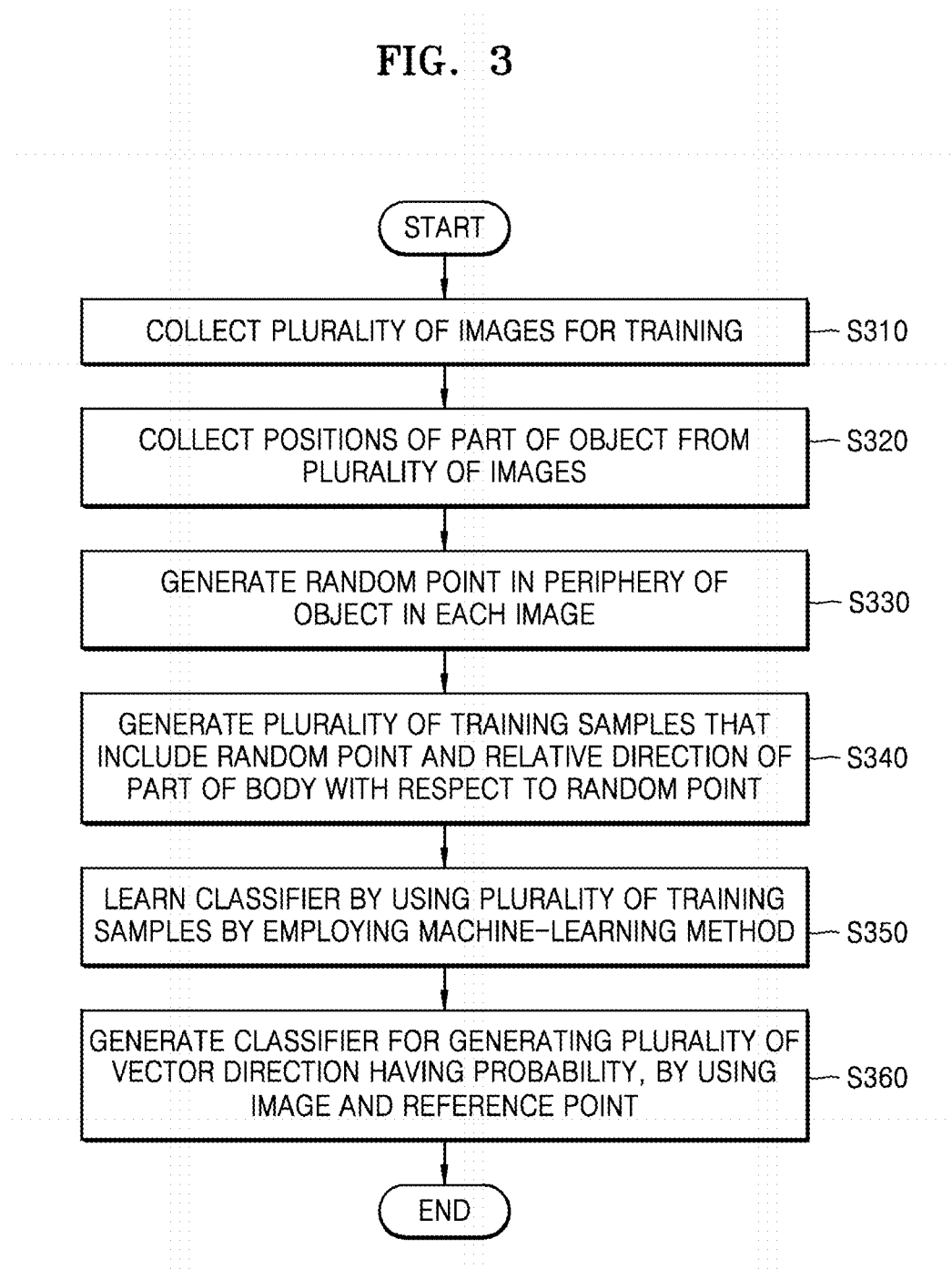
FIG. 3 illustrates a flowchart of a training process of generating a classifier in an image by performing a machine-learning method according to an exemplary embodiment.

FIG. 3 illustrates a training process for generating a classifier according to one or more exemplary embodiments. The training process is as follows:

In operation S310, a plurality of marked images for the training process are collected. In the current exemplary embodiment, an image may include a depth image or a 2D image. A marked image may refer to an image in which a position of a part of a body is shown.

In operation S320, a position of the part of the object is collected from the plurality of images. In detail, this may refer to searching for a ground-truth position of a part of a body of the object in each of the plurality of images. A ground-truth position of the part of the body may be already shown in the collected image or may be additionally input by a user to the collected image.

In operation S330, a plurality of random positions are generated near the part of the body.

In operation S340, a plurality of training samples, which include the generated random points and a set of vectors in a relative direction of the part of the body with respect to the random points, are generated.

In operation S350, a classifier is trained by using the generated plurality of training samples by employing a machine-learning method. A random tree algorithm, a forest algorithm, a neutral network forest algorithm, a support vector machine forest algorithm, or the like may be employed as an algorithm for training. In detail, the classifier may be generated in a direction in which regression to a relative direction is reduced. In other words, a regression tree may be trained based on a normalization vector of a training sample, so that similar normalization vectors may converge to each other. Additionally, directions of the generated classifier may be clustered into a determined number of directions. For example, based on K-mean clustering into 4 directions, a plurality of directions may be reduced to 4 directions. As such, a plurality of vector directions having a probability that the reference point is moved to a part of an object from each random point in a depth image may be learned through the process described above.

In operation S360, machine-learning of the classifier used by the apparatus for estimating a position of a part of an object is finished by performing the process described above. In other words, generating of the classifier for the part of the object is finished. The classifier may be learned by performing the operations described above, receive an input of a depth image and a reference point, and thus, generate at least one piece of direction information regarding a probability and a direction in which the reference point is to be moved to a part of an object. For example, normalization vectors of a predetermined number of directions, which may be selected, and probabilities respectively corresponding to the directions may be generated. The probabilities respectively corresponding to the directions may refer to probabilities that, if a direction corresponding to the reference point is selected and the reference point is moved, the reference point may be moved to the part of the object. This is described in detail with reference to FIG. 8.

Figure 4:
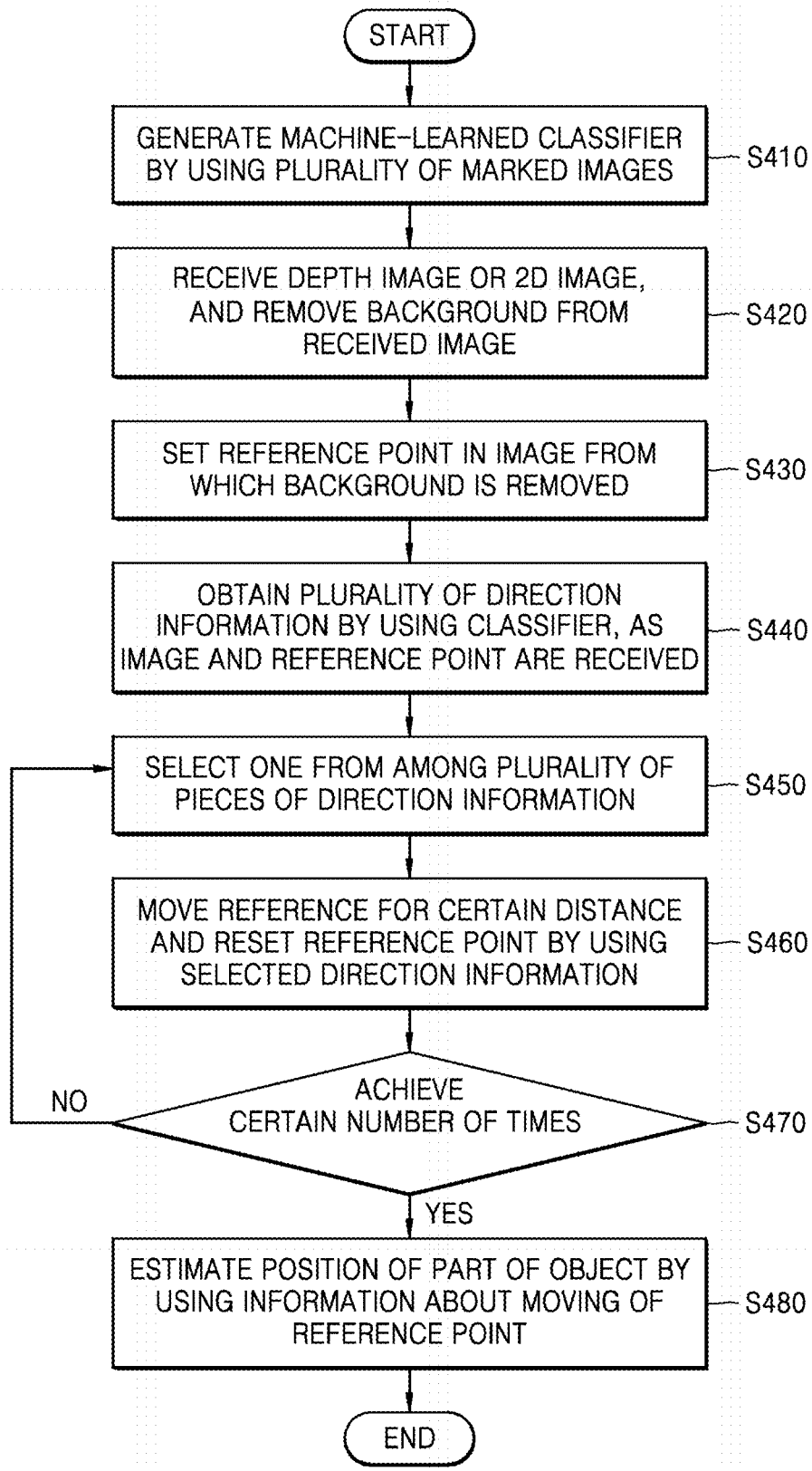
FIG. 4 illustrates a flowchart of a method of generating a machine-learned classifier and estimating a position of a part of an object by using the same, according to an exemplary embodiment.

FIG. 4 illustrates a flowchart of a method of estimating a position of a part of a body of an object in a depth image, according to one or more exemplary embodiments. Descriptions already provided with reference to FIGS. 2 and 3 may be briefly provided or may not be repeated here again.

In operation S410, a machine-learned classifier may be generated by using a plurality of images marked for training.

In operation S420, a depth image or a 2D image for estimating a position of the object may be received, and a background may be removed from the received image.

In operation S430, a reference point is set at a starting point, from which the reference point is to be moved, in the image from which the background is removed.

In operation S440, a part of the object in the image in which the reference point is set may be input to the machine-learned classifier, and thus, a plurality of pieces of direction information may be obtained. The plurality of pieces of direction information may include at least one direction vector having a probability in which the reference point may be moved to the part of the object.

In operation S450, a direction vector, from among the obtained at least one direction vector, may be selected.

In operation S460, the reference point may be moved to the selected direction vector in correspondence with a predetermined distance.

In operation S470, it is checked whether the predetermined number of times the reference point is moved to the selected direction vector is achieved. If the reference point is not moved to the selected direction vector the predetermined number of times, operations S440 through S460 may be performed again. If the reference point is moved to the selected direction vector the predetermined number of times, operation S480 may be performed instead of operations S440 through S460. The predetermined number of times that the reference point is moved may be set differently for the reference point based on the part of the body to which the reference point corresponds. In operation S480, a position of the part of the object may be estimated by using information regarding the moving of the reference point. For example, a position of the part of the object may be estimated based on points to which the reference point is moved.

Figure 5:
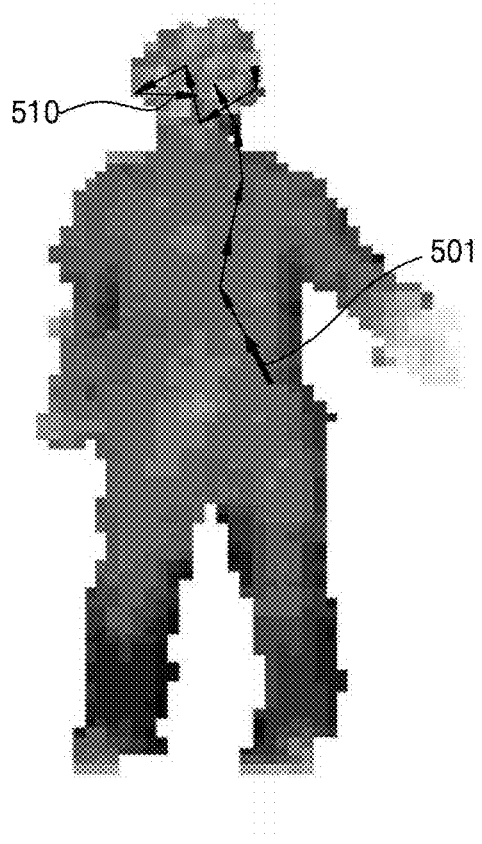
FIG. 5 illustrates a process of estimating a position of a part of an object in an image, particularly, estimating a position of a head by using a random position as a starting point according to an exemplary embodiment.

FIG. 5 illustrates moving of a reference point for classifying a part of an object by estimating a position of a part of an object in a depth image, particularly, estimating a position of a part of an object, for example, a head by employing a random point as the reference point, according to one or more exemplary embodiments. Referring to FIG. 5, a reference point that is initially at a random point moves from a periphery 501 of a center of a body of the object, which was randomly selected, toward a head in correspondence with a predetermined distance. As shown in FIG. 5, after the reference point reaches the head, the reference point may move in an area of the head as shown in 510 in FIG. 5.

In detail, according to one or more exemplary embodiments, an algorithm for classifying a head is as follows:

(1) A reference point is selected at random from a received image.

(2) A plurality of directions are obtained by searching for a relative direction of a head with respect to the reference point according to a probability by using a machine-learned classifier that is learned with respect to the head. According to one or more exemplary embodiments, a plurality of directions, obtained from the reference point by the machine-learned classifier, may respectively have a probability in which the reference point may move to the head.

(3) One of the plurality of directions is selected, and the reference point moves in the selected direction. A distance for which the reference point moves may be machine-learned with respect to a part of an object that is the head, or selected together. A point to which the reference point newly moved becomes a new reference point. A direction in which a reference point moves may be selected at random from the plurality of directions obtained by the machine-learned classifier, based on the probability.

(4) Steps (2) and (3) are repeatedly performed until a predetermined number of times for which moving of the reference point is repeated or until an average position of a part of a body is found with accuracy. The accuracy may be measured according to a distribution of the points to which the reference point moved. For example, a position of the part of the body may be determined by an average position of points to which the reference point moved. If the distribution of the points has a dispersion value equal to or less than a threshold, it may be estimated that a position of the part of the body is accurately determined. The predetermined number of times when the moving of the reference point is repeated is described with reference to FIG. 2.

(5) After the reference point is moved many times, positions of the reference point are ultimately placed in a periphery of the head. In other words, since the machine-learned classifier is trained for the head, after the reference point is moved a lot of times, locations of the reference point may converge at points corresponding to the head according to a probability. Thus, the points corresponding to the head may be estimated based on moving of the reference point. For example, points corresponding to the head may be estimated by averaging the locations to which the reference point is moved. Additionally, according to other exemplary embodiments, points corresponding to the head may be estimated by averaging the points to which the reference point has moved until before the reference point moved last in 510.

Figure 6:
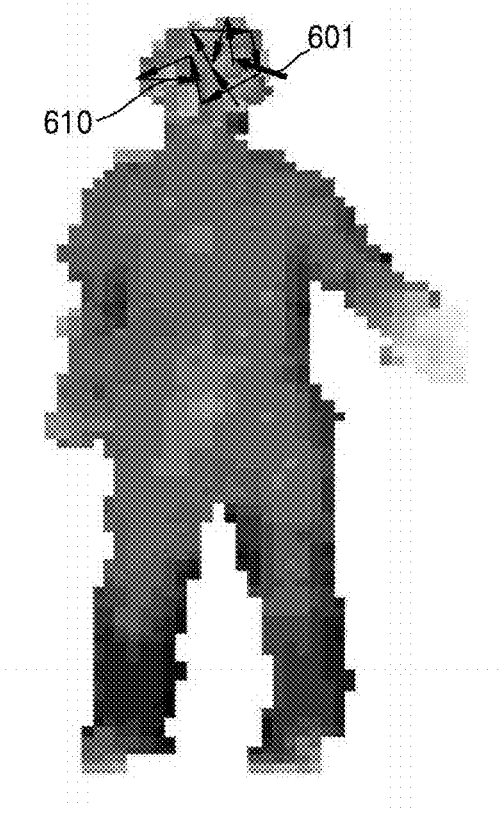
FIG. 6 illustrates a process of estimating a position of a part of an object in an image, particularly, estimating a position of a head by using a position of the head in an image of a previous frame as a starting point according to an exemplary embodiment.

FIG. 6 illustrates moving of a reference point for classifying a part of a body in a depth image, particularly, for estimating a position of a head in an image of a current frame by employing a position of the head in an image of a previous frame as a starting point 601, according to one or more exemplary embodiments. In FIG. 6, it may be understood that a reference point reaches a part of an object, that is, a head after the reference point moves for a smaller number of times compared to the reference point shown in FIG. 5. As shown in FIG. 6, the part of the object may be found more quickly when a reference point starts to move based on a position of the part of the object in an image of a previous frame than when a reference point starts to move after the reference point is set at a random point.

Figure 7:
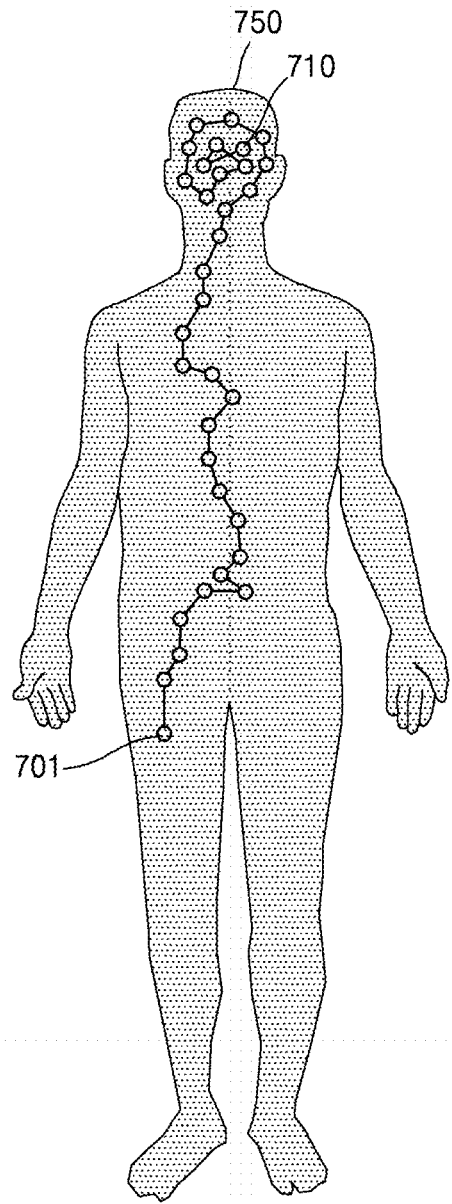
FIG. 7 illustrates a diagram showing an exemplary embodiment of estimating a position of a part of an object in an image by moving a reference point.

FIG. 7 illustrates a diagram for explaining a process of estimating a position of a part of an object by using moving of a reference point in an image, according to one or more exemplary embodiments.

In FIG. 7, the reference point moves from a point 701 in a periphery of a center of a body of the object to a head 750 that is a part of the object. It is shown that the reference point continuously moves in a part of the object, that is, the head 750, during last moves of the reference point. This is because, since the machine-learned classifier is trained for the head 750, position information of the part of the object may be determined by using a process when the reference point moves towards the head 750.

For example, if points to which the reference point has moved are grouped in correspondence with a predetermined number and a distribution of the points is placed in a certain area of the object, it may be estimated that the reference point has moved to a position of the part of the object, and thus, positions of the predetermined number of points are in a position of the part of the object.

Alternatively, an average position of the points to which the reference point has moved may be estimated as a position of the part of the body. For example, points corresponding to the head may be estimated by averaging positions to which the reference point has moved. According to other exemplary embodiments, points corresponding to the head may be estimated by averaging locations to which the reference point has moved until before the reference point moves to a current location in a last move 710.

FIG. 8 shows a table for explaining a process of moving a reference point for estimating a position of a part of an object in an image, according to one or more exemplary embodiments.

A pixel (X, Y), shown in FIG. 8, corresponds to a 2D coordinate. If it is assumed that a pixel (1, 1) in an upper left part of the table is a reference point, and a pixel (10, 10) in a lower right part of the table is a head, one or more exemplary embodiments of estimating a position (pixel) of the head in the image are as follows:

A classifier may generate four pieces of direction information (x, y, p) by using a depth image and the reference point (1, 1). The four pieces of direction information (x, y, p) may be as follows:

For example, the generated four pieces of direction information (x, y, p) may be (1, 0, 0.1), (0, 1, 0.1), (−1, 0, 0.25), and (0.707, 0.707, 0.55).

In the direction information (x, y, p), (x, y) is a unit vector, and p correspond to a probability. (x, y) refers to a unit vector for a direction, and p refers to a probability in which, if the reference point (1, 1) moves in this direction, the reference point (1, 1) may move to a part of an object.

In an example described above, $x*x+y*y=1$, and a probability $p\_1+p\_2+p\_3+p\_4=1$ may be checked. Only one of the four pieces of direction information (x, y, p) may be selected, and a reference point may move according to the selected direction information (x, y, p). One of four pieces of the direction information (x, y, p) may be randomly selected from among probabilities {0.1, 0.1, 0.25, 0.55}.

If it is assumed that (0.707, 0.707, 0.55) is selected, the reference point (1, 1) may move to a pixel (3, 3) in correspondence with 2.828 in a direction of (0.707, 0.707). 2.828 may be a predetermined distance. The predetermined distance may be determined by using various methods as described with reference to FIG. 2.

Then, new four pieces of direction information (x, y, p) may be generated by using the depth image and the reference point (3, 3). For example, the new four pieces of direction information (x, y, p) may be (−0.707, 0.707, 0.35), (−0.707, −0.707, 0.05), (−1, 0, 0.15), and (0.707, 0.707, 0.45).

If the reference point moves to another position, the classifier may receive an input of a coordinate of the reference point, and generate new four pieces of direction information (x, y, p). According to one or more exemplary embodiments, the apparatus may randomly select another piece of direction information, and move a location of the reference point in correspondence with 2.828 according to the selected direction information. For example, if it is assumed that (−1, 0, 0.15) is selected, the reference point may move from a pixel (3, 3) to a pixel (0.172, 3), and the pixel (0.172, 3) becomes a new reference point.

After this process is repeatedly performed, since the classifier is trained for the head, locations of the reference may converge at points corresponding to the head according to a probability. If the reference point keeps moving, the reference point may continuously move to a periphery of the head (a pixel (10, 10)).

In the current exemplary embodiment, a description is provided with reference to a 2D image for the sake of brevity. However, this may also be applied to a depth image. Additionally, as an example, four directions are generated by the classifier, but exemplary embodiments are not limited thereto. A number of directions may be appropriately selected or adjusted in a training process.

Figure 9:
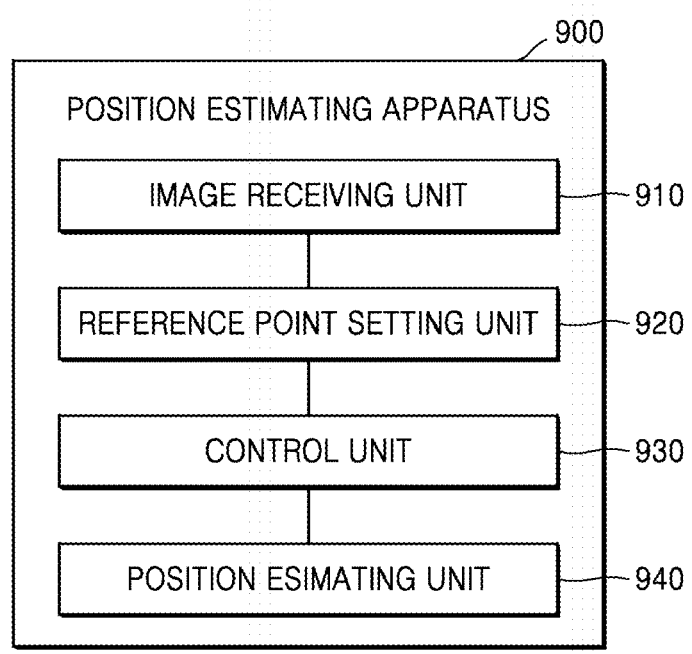
FIG. 9 illustrates a block diagram of an apparatus for estimating a position of a part of an object in an image according to an exemplary embodiment.

FIG. 9 illustrates a block diagram of a position estimating apparatus 900 for estimating a position of a part of an object in a depth image according to one or more exemplary embodiments. According to one or more exemplary embodiments, the position estimating apparatus 900 for estimating a position of a part of an object may include an image receiving unit 910 (e.g., an image receiver, etc.), a reference point setting unit 920 (e.g., a reference point setter, etc.), a control unit 930 (e.g., a controller, processor, etc.), and a position estimating unit 940 (e.g., a position estimator, etc.).

The image receiving unit 910 may receive a 2D image or a depth image.

The reference point setting unit 920 may set a reference point in the received image.

The control unit 930 may obtain at least one piece of direction information about a probability and a direction in which the reference point is to be moved to a part of the object by using a classifier, and repeat a process of moving the reference point for a predetermined distance and resetting the reference point by using the obtained direction information for a predetermined number of times.

The position estimating unit 940 may estimate a position of a part of an object in an image by using information about moving of the reference point as the reference point is reset for a predetermined number of times.

Figure 10:
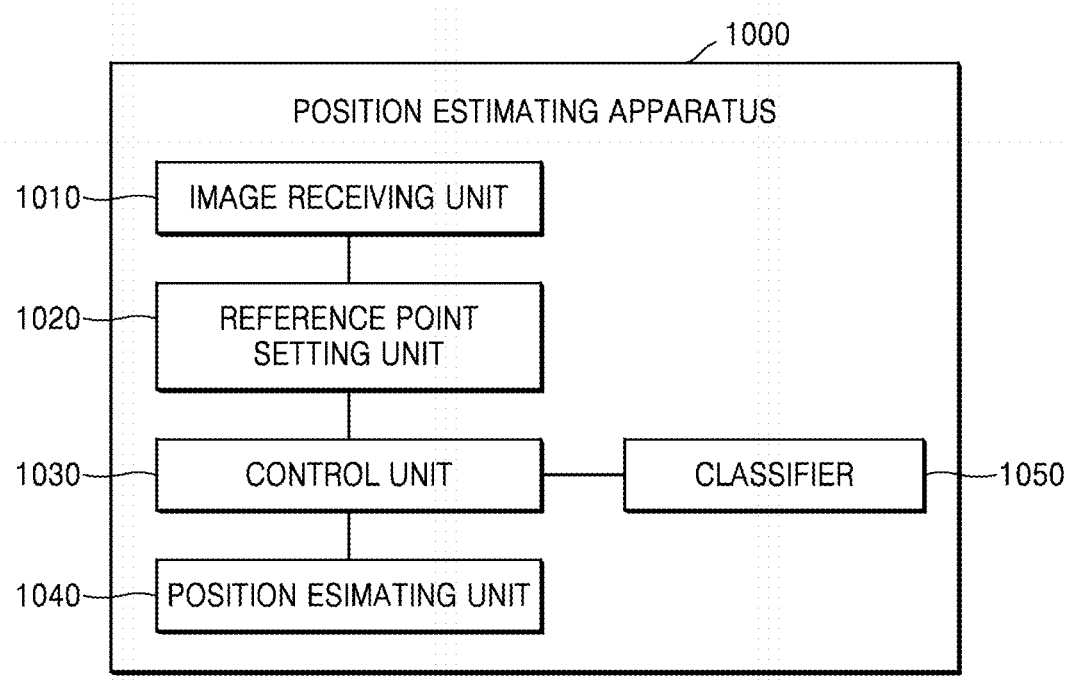
FIG. 10 illustrates a block diagram of an apparatus for estimating a position of a part of an object in an image according to another exemplary embodiment.

FIG. 10 illustrates a block diagram of a position estimating apparatus 1000 for estimating a position of a part of an object in a depth image according to one or more exemplary embodiments. According to one or more exemplary embodiments, the position estimating apparatus 1000 for estimating a position of a part of an object may include an image receiving unit 1010, a reference point setting unit 1020, a control unit 1030, a position estimating unit 1040, and a classifier 1050.

Descriptions about the image receiving unit 1010, the reference point setting unit 1020, the control unit 1030, and the position estimating unit 1040 are identical to descriptions provided for the image receiving unit 910, the reference point setting unit 920, the control unit 930, and the position estimating unit 940 with reference to FIG. 9.

The classifier 1050 may be machine-learned for the part of the object, and receive an input of an image in which a reference point is set. Then, the classifier 1050 may generate at least one piece of direction information about a probability and a direction in which the set reference is to be moved to the part of the object, and transmit the generated at least one piece of direction information to the control unit 1030. In FIG. 10, the classifier 1050 is shown as being located in the position estimating apparatus 1000, but is not limited thereto. The classifier 1050 may be located outside the position estimating apparatus 1000.

According to one or more exemplary embodiments, an apparatus for estimating a position of a part of an object may reduce total calculation time for estimating the position, appropriately adjust an amount of calculation time allocated to estimate each part of the object, and efficiently classify each part of the object by using a classifier respectively for each part of the object.

According to one or more exemplary embodiments, the apparatus described herein may include a processor, a memory for storing program data and executing it, a permanent storage such as a disk drive, and user interface devices, including a display, keys, etc.

When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. This media can be read by the computer, stored in the memory, and executed by the processor.

For the purposes of promoting an understanding of the principles of the inventive concept, reference has been made to the exemplary embodiments illustrated in the drawings, and specific language has been used to describe these exemplary embodiments. However, no limitation of the scope of the inventive concept is intended by this specific language, and the inventive concept should be construed to encompass all exemplary embodiments that would normally occur to one of ordinary skill in the art.

The particular implementations shown and described herein are exemplary embodiments and are not intended to otherwise limit the scope of the inventive concept in any way. For the sake of brevity, electronics, control systems, software development and other functional aspects of the systems (and components of the individual operating components of the systems) that are not necessary to understand the exemplary embodiments may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

It will be understood by those of ordinary skill in the art that various modifications, combinations, and changes can be formed according to design conditions and factors within the scope of the attached claims or the equivalents.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus configured to estimate a position of a part of an object in an image, the apparatus comprising:
    an image receiver configured to receive the image;
    a reference point setter configured to set a reference point in the image;
    a controller configured to generate information about the reference point by repeating a process a predetermined number of times, the process comprising obtaining at least one piece of direction information about a probability and a direction that the reference point is to be moved to the part of the object by a classifier, and resetting the reference point by moving the reference point a predetermined distance based on the at least one piece of direction information; and
    a location estimator configured to estimate a position of the part of the object in the image by using the information about the reference point as the reference point is reset the predetermined number of times.

2. The apparatus of claim 1, wherein the classifier is machine-learned for the part of the object, and generates the at least one piece of direction information about the probability and the direction in which the reference point is to be moved to the part of the object.

3. The apparatus of claim 1, wherein the information about the moving of the reference point comprises a route via which the reference point is moved.

4. The apparatus of claim 1, wherein the controller is further configured to remove a background from the image.

5. The apparatus of claim 4, wherein the reference point is a point that is randomly selected in the image from which the background is removed.

6. The apparatus of claim 4, wherein the reference point is set by using the position of the part of the object in one of images of frames previous to a current frame of the image from which the background is removed.

7. The apparatus of claim 4, wherein the reference point is a center point of the image from which the background is removed.

8. The apparatus of claim 1, wherein the image comprises at least one selected from among a depth image and a two-dimensional (2D) image.

9. The apparatus of claim 1, wherein the object comprises at least one selected from among of a physical body and a thing.

10. The apparatus of claim 1, wherein the controller randomly selects one of the at least one piece of direction information.

11. The apparatus of claim 1, wherein the controller selects one from among the at least one piece of direction information based on a probability corresponding to the at least one piece of direction information.

12. The apparatus of claim 1, wherein the predetermined distance is determined based on characteristics of the part of the object.

13. The apparatus of claim 1, wherein the predetermined number of times is set based on a period of time allocated to estimate the position of the part of the object.

14. The apparatus of claim 1, wherein the predetermined number of times is determined based on a dispersion value of locations of the reference point which are changed according to the moving of the reference point.

15. The apparatus of claim 1, wherein the predetermined number of times is determined based on a probability corresponding to the at least one piece of direction information obtained by using the classifier.

16. The apparatus of claim 1, wherein the controller estimates a pose of the object based on the position of the part of the object.

17. A method of estimating a position of a part of an object in an image, the method comprising:
receiving the image;
setting a reference point in the image;
generating information about the reference point by repeating a process a predetermined number of times, the process comprising obtaining at least one piece of direction information about a probability and a direction that the reference point is to be moved to the part of the object by a classifier, and resetting the reference point by moving the reference point a predetermined distance based on the at least one piece of direction information; and
estimating a position of the part of the object in the image by using the information about the reference point as the reference point is reset the predetermined number of times.

18. The method of claim 17, wherein the classifier is machine-learned for the part of the object, and generate the at least one piece of direction information about the probability and the direction in which the reference point is to be moved to the part of the object.

19. The method of claim 17, wherein the information about the moving of the reference point comprises a route via which the reference point is moved.

20. The method of claim 17, further comprising randomly selecting one from among the at least one piece of direction information.

21. The method of claim 17, further comprising selecting one from among the obtained at least one piece of direction information based on the probability.

22. The method of claim 17, further comprising estimating a pose of the object based on the position of the part of the object.

23. A non-transitory computer-readable recording storage medium having stored thereon a computer program which, when executed by a computer, performs the method of claim 17.

24. An apparatus configured to estimate a position of a part of an object in an image, the apparatus comprising:
a memory comprising computer executable instructions; and
a processor configured to read and execute the computer executable instructions, the computer executable instruction causing the processor to:
set a reference point in an image of an object;
generate information about the reference point by repeating a process a predetermined number of times, the process comprising obtaining at least one piece of direction information about a probability and a direction that the reference point is to be moved to the part of the object by a classifier, and resetting the reference point by moving the reference point a predetermined distance based on the at least one piece of direction information; and
estimate a position of the part of the object in the image by using the information about the reference point as the reference point is reset the predetermined number of times.

25. The apparatus of claim 24, wherein the classifier is machine-learned for the part of the object, and generates the at least one piece of direction information about the probability and the direction in which the reference point is to be moved to the part of the object.

26. The apparatus of claim 24, wherein the computer executable instruction further cause the processor to:
estimate a pose of the object based on the position of the part of the object.

* * * * *